Oct. 16, 1945. J. C. HROCH, JR 2,387,074
MATERIAL WORKING APPARATUS
Filed Feb. 29, 1944   3 Sheets-Sheet 1
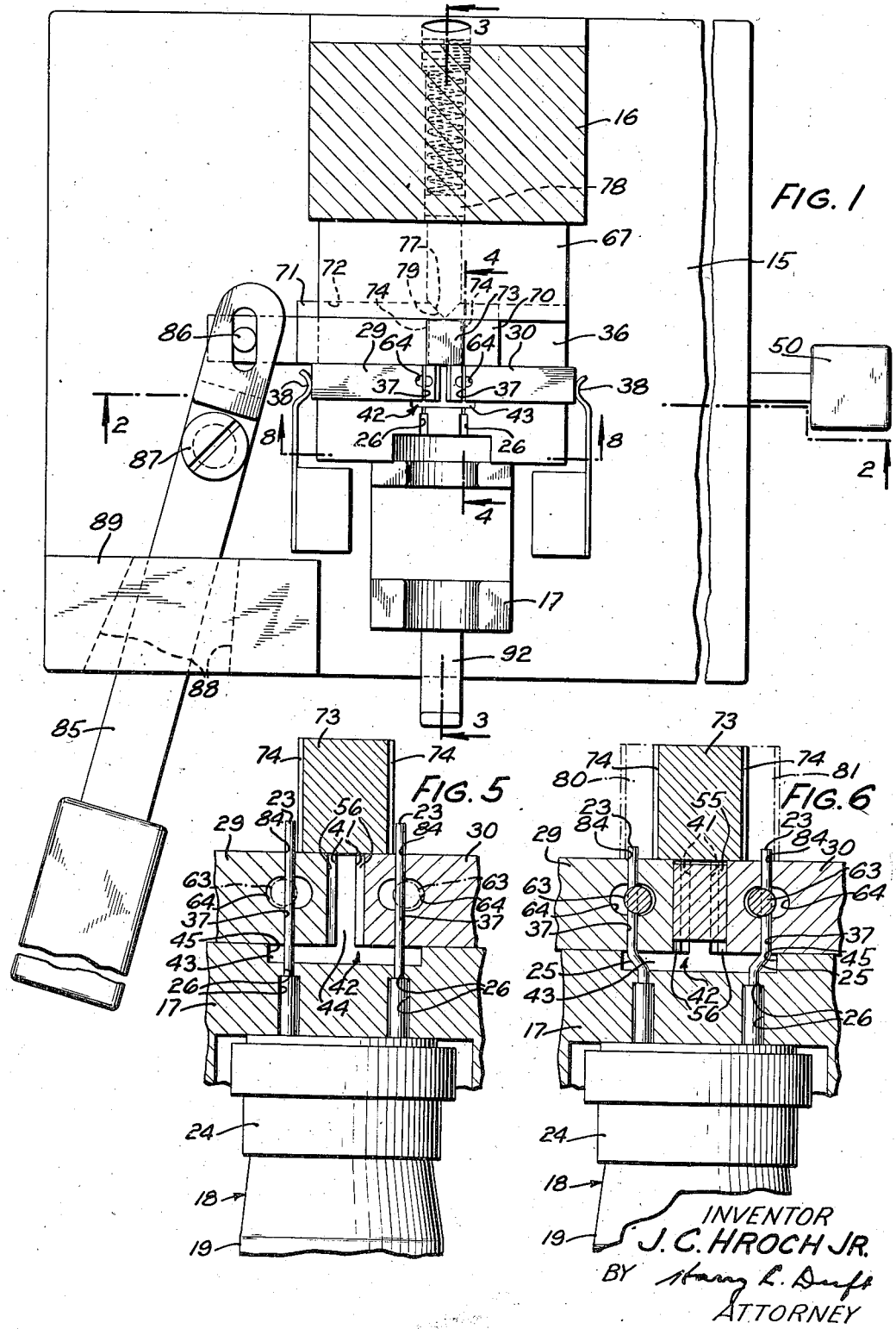
INVENTOR
J. C. HROCH JR.
BY
ATTORNEY Oct. 16, 1945. J. C. HROCH, JR 2,387,074
MATERIAL WORKING APPARATUS
Filed Feb. 29, 1944    3 Sheets-Sheet 2
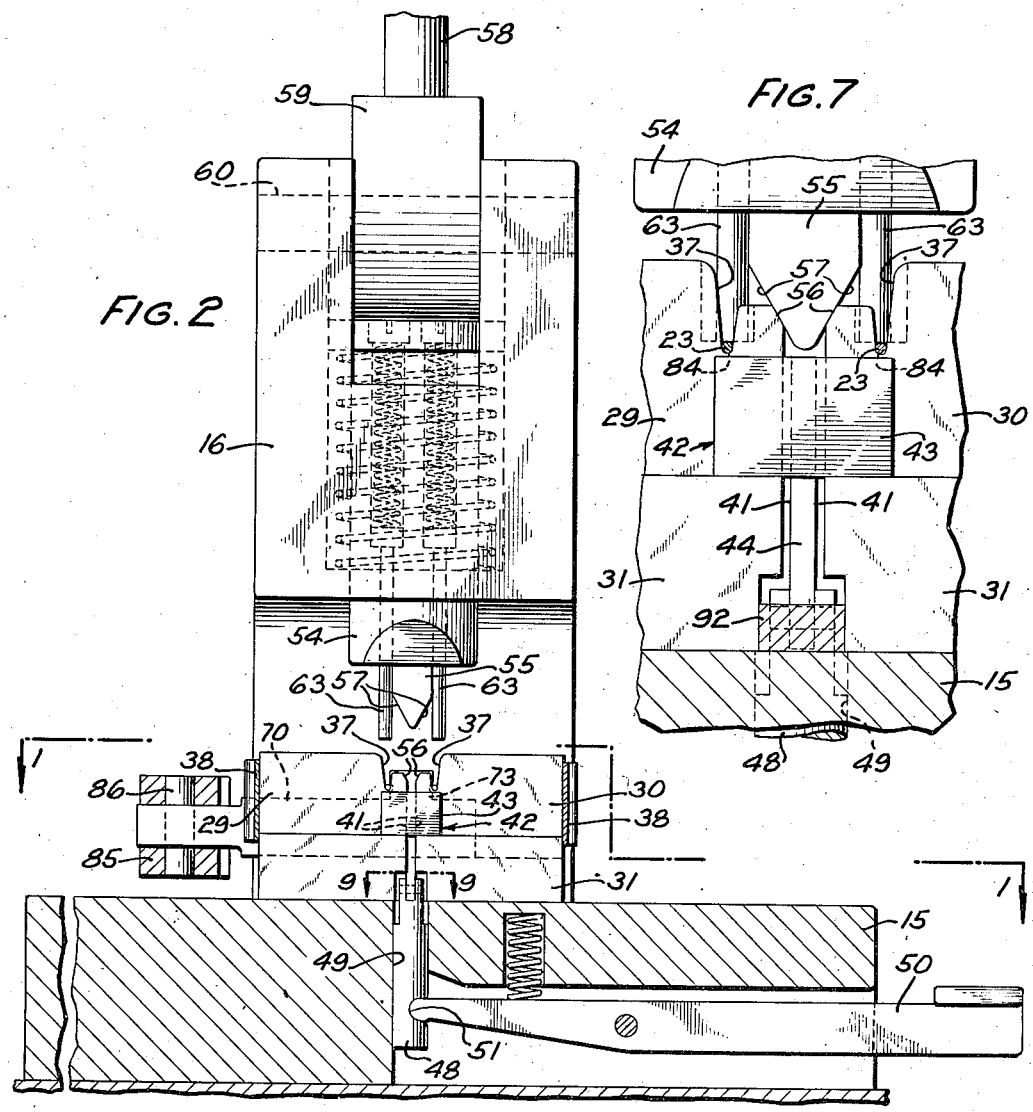
INVENTOR
J.C. HROCH JR.
BY
ATTORNEY Oct. 16, 1945.  J. C. HROCH, JR  2,387,074
MATERIAL WORKING APPARATUS
Filed Feb. 29, 1944  3 Sheets-Sheet 3
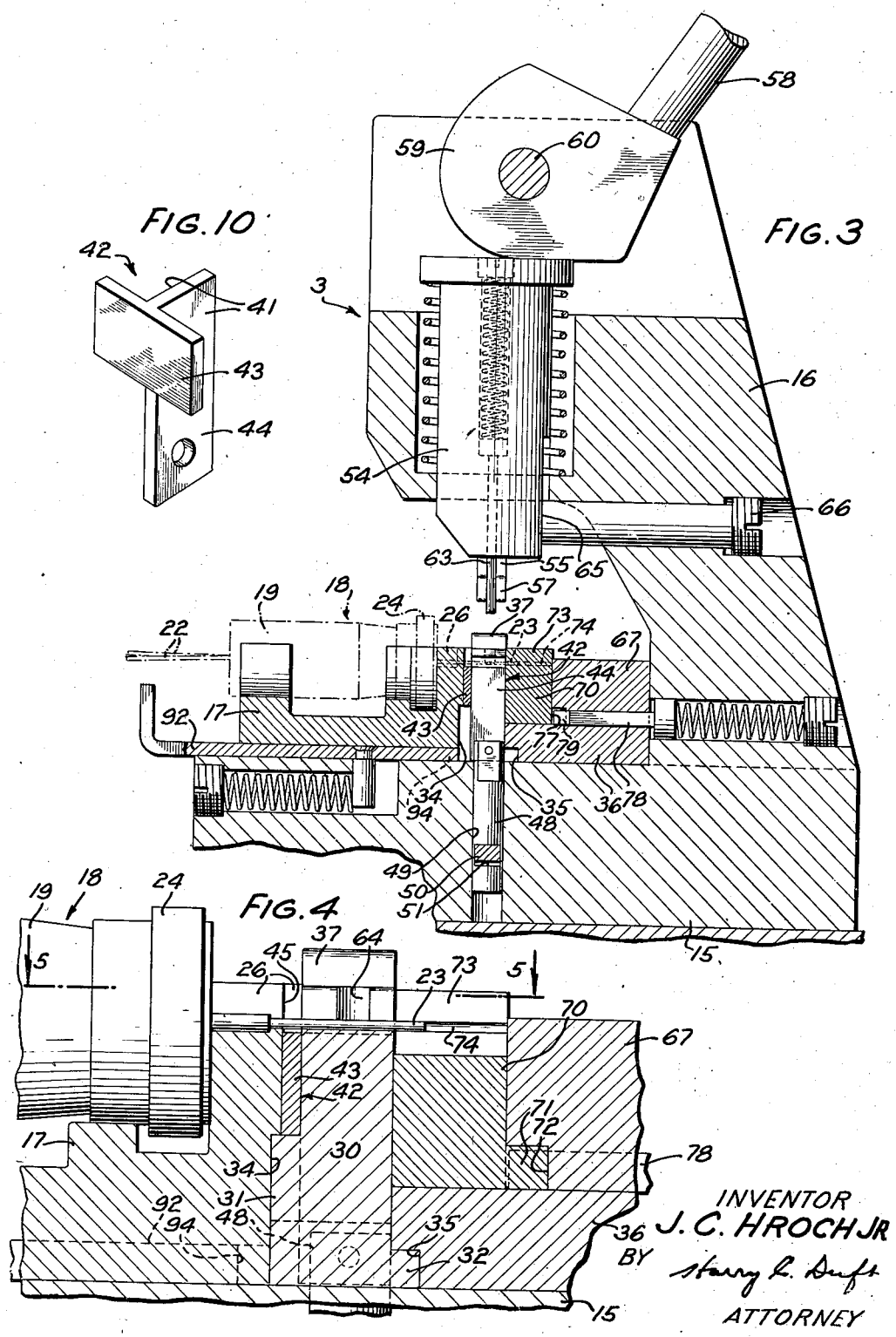

Patented Oct. 16, 1945

2,387,074

UNITED STATES PATENT OFFICE 2,387,074

MATERIAL WORKING APPARATUS

James C. Hroch, Jr., Cicero, Ill., assignor to Western Electric Company, Incorporated, New York, N. Y., a corporation of New York Application February 29, 1944, Serial No. 524,421

9 Claims. (Cl. 140—71.5)

This invention relates to material working apparatus and particularly to apparatus for forming and shearing lead-in wires sealed to glass vacuum tube stems.

An object of the present invention is to provide a simple and practical apparatus for accurately shaping in opposite laterally offset relation and shearing to a predetermined length the lead-in wires sealed to a glass vacuum tube stem.

In accordance with the above object, the present invention, in one embodiment thereof, comprises a fixed rest for a glass vacuum tube stem, inner portions of the lead wires sealed thereto being entered in holding slots in the rest and outer portions thereof entered in holding slots in slidable spring returned forming members normally aligned with the holding slots with the outer ends of the wires extending from the latter slots into the path of a manually actuated slidable blade for shearing the wires to a predetermined length after the operation of the forming members to shape the wires in opposite lateral offset relation relative to the inner portions thereof held in the slots of the fixed rest. A manually actuated spring-pressed wedge-shaped member is arranged to engage opposed inner ends of the forming members to operate the same after spring-pressed pads engage the wires to retain them in the holding slots. Manual lever-actuated means is provided for stripping the wires from the holding slots upon completion of the shaping and severing operations.

Other objects and advantages of the invention will be apparent from the following detailed description taken in conjunction with the accompanying drawings, in which Fig. 1 is a plan view, partly in section, taken on the line 1—1 of Fig. 2, showing a material working apparatus embodying the features of the invention, the apparatus being shown in its normal inoperative position;

Figs. 2 and 3 are vertical sections taken on the lines 2—2 and 3—3, respectively, of Fig. 1;

Fig. 4 is a fragmentary vertical section on an enlarged scale taken on the line 4—4 of Fig. 1;

Fig. 5 is a plan section taken on the line 5—5 of Fig. 4 showing the relation of the parts before the operation of forming the lead wires;

Fig. 6 is a view similar to Fig. 5 after the forming of the lead wires and before the ends of the wires have been severed;

Fig. 7 is an enlarged fragmentary view of Fig. 2, partly in section, the apparatus having been operated to form the lead wires;

Fig. 8 is a fragmentary vertical section taken on the line 8—8 of Fig. 1;

Fig. 9 is an enlarged fragmentary plan section taken on the line 9—9 of Fig. 2; and Fig. 10 is a perspective view of a part of the apparatus employed in stripping the formed lead wires from the apparatus.

Referring to the drawings in detail, 15 indicates a base having a standard 16 at its right-hand end (Fig. 3), which supports certain operating parts of the apparatus to be described hereinafter. Mounted upon and fixed to the left-hand end of the base 15 and aligned with the standard 16, as viewed in Fig. 1, is a rest 17 for supporting a vacuum tube stem 18, shown in broken outline in Fig. 3 and fragmentarily in full lines in Figs. 4, 5 and 6. The stem 18 comprises a glass portion 19 in which are sealed a pair of wires 22 (Fig. 3) terminating at their right ends (Fig. 4) in input leads 23, which project from a shouldered copper base member 24 sealed to the glass portion 19. For a predetermined length outside the member 24, the leads 23 are of one diameter and their extreme outer ends are of reduced diameter. It is necessary, in mounting the vacuum tube and to connect the input leads 23, that the leads be laterally offset in opposite directions, as indicated at 25 (Fig. 6) in parallel alignment and with a predetermined spaced relation. The rest 17 is so shaped that, in mounting the stem 18 thereon, it nests therein and the larger diameter of the lead 23 and short adjacent outer ends thereof are guided into tapered slots 26 (Figs. 4, 5 and 6), which serves to position the leads 23 in horizontal alignment.

Slidably mounted on the base 15 at the right end of the rest 17, as viewed in Fig. 4, or at the upper end of the rest, as shown in Figs. 5 and 6, are irregular-shaped wire-forming members 29 and 30, each formed with opposite key-like formations 31 and 32, which ride in slideways 34 and 35 formed in the adjacent end faces of the rest 17 and a plate 36, respectively, fixed to the base 15. Tapered slots 37 for receiving the input leads 23 are formed in the upper faces of the forming members 29 and 30 adjacent their inner ends (Figs. 1 and 4), which, in the normal position of the members, are aligned with the slots 26 in the rest 17. Leaf springs 38 fixed to the base 15 and acting against the outer end faces of the forming members 29 and 30 serve to maintain the members in their inner normal positions in abutting relation with opposite faces 41 of an irregularly-shaped reciprocatory stripping member 42 (Fig. 10), which is of T-shaped formation, in plan view, as clearly shown in Figs. 1, 5 and 6. A vertical arm 43 of the stripping member 42 extends at right angles to the faces 41 of a vertical arm 44 thereof so that its upper face lies in the plane of the lower peripheral surface of the reduced diameter of the input leads 23 (Figs. 4 and 7) and its lower face rests on the upper face of the key-like formations 31 of the forming members 29 and 30. In an upward operating movement of the member 42 (Figs. 4, 5 and 6), the arm 43 thereof is guided in a slideway 45 formed in the right-hand end face of the rest 17 and also upon the left-hand end faces of the forming members 29 and 30 (Fig. 4). The vertical arm 44 of the member 42, at its lower end (Figs. 2, 3, 4 and 7), is connected to a rod 48 slidable in an aperture 49 in the base 15. A spring-retracted hand lever 50, pivoted in a suitable opening in the base 15, and operatively connected at its inner end, as indicated at 51, to the rod 48, is depressed to raise the stripping member 42 which serves to strip or free the input leads 23 from the slots 26 and 37 and thus facilitates the manual removal of the stem 19 from the apparatus without deforming the leads 23 after they have been worked upon.

Reciprocably carried in the standard 16 is a spring-returned plunger 54 (Figs. 2, 3 and 7) carrying a dependent wedge-shaped member 55, which is normally arranged above and intermediate the inner opposed ends of the forming members 29 and 30, the end faces of which are inclined, as indicated at 56, to receive therebetween inclined faces 57 of the member 55. To move the wedge-shaped member 55 downwardly to enter it between the inclined faces of the forming members 29 and 30 and actuate the latter, a hand lever 58 attached to a cam 59 pivoted at 60 to a forked upper end of the standard 16 is rocked counterclockwise from the position shown in Fig. 3, the cam engaging an enlarged upper end face of the plunger. This actuation of the lever 58 causes the forming members 29 and 30 to be moved outwardly from their position shown in Fig. 5 to the positions thereof shown in Fig. 6, thereby bending and shaping the outer ends of the input leads 23 in opposite laterally offset relation, as indicated at 25, due to the inner ends of the leads being held fixed in the slots 26 of the rest 17.

Also carried by the plunger 54 are a pair of spring-pressed pads 63, which, in advance of the wedge-shaped member 55 actuating the forming members 29 and 30 in the manner previously described, engage the input leads 23 to hold them down in the bottom of the slots 37 in the forming members during the forming operation thereon. Slots 64 of suitable depth (Figs. 5 and 6) are provided in the forming members 29 and 30, in each side face of the slots 37, to permit the pads 63 to engage the leads 23 and remain in engagement therewith during the actuation of the forming members. To prevent the generally circular plunger 54 from rotating in the standard 16, it is formed with a flat face 65, which is engaged by a threaded pin 66 carried in the standard.

Slidable horizontally upon the plate 36 and opposed vertical faces of the forming members 29 and 30 and a plate 67 is a bar 70 having a key-like formation 71, which rides in a slideway 72 formed in the plate 67. Intermediate its ends, the bar 70 has a raised shearing portion 73 (Figs. 2, 4, 5 and 6) and in the inoperative position (Fig. 5) it is centered with the opposed inner ends of the forming member 29 and 30, the projecting outer ends of the input leads 23 lying adjacent opposed faces of the shearing portion 73. The latter faces are provided with grooves 74 in alignment with the leads 23 so that when the bar is reciprocated in a manner to be presently described for the purpose of shearing the leads to a predetermined length, the leads are nested therein for shearing. A V-shaped notch 77 in the portion 71 of the bar 70 is engaged by a suitably arranged and mounted spring-pressed plunger 78 having an end 79 formed with inclined faces for engaging the inclined faces of the bar notch. Thus, the bar 70 is yieldably maintained in its normal position (Fig. 5) and may be shifted to the right or left thereof, as indicated by the broken lines 80 and 81 (Fig. 6) to first shear one lead 23 and then the other, the leads being sheared between stationary shearing edges, indicated at 84 (Figs. 5 and 7) at the bottom of the grooves 37 of the forming members 29 and 30 and those provided on the bar 70 at the grooves 74.

The shearing bar 70 is actuated (Fig. 1) by rocking a hand lever 85, which is operatively connected to the bar at 86, and pivoted at 87 to the base 15 in one direction and then in the opposite direction and finally back to its normal position, where it is yieldably retained by the spring-pressed plunger 78 entering the notch 77 in the bar. Stop faces 88 on a slotted member 89 engaged by the lever 85 serve to limit the movement of the shearing bar 70 in either direction.

To insure that the spring-retracted forming members 29 and 30 will remain in their outward actuated positions (Fig. 6) after the input leads 23 have been shaped at 25 and the wedge-shaped actuating member 55 is raised to its normal inoperative position and until the shearing operation is completed, the following means is provided: A spring-pressed latch member 92 is mounted on the base 15 and guided in a slot 93 formed in the bottom of the rest 17. At its inner end, the latch member 92 is notched at 94 upon opposite sides (Figs. 4 and 9) and its reduced end face normally abuts the forming members 29 and 30. Upon the forming members 29 and 30 being actuated, the notched end portion of the latch member 92 springs into position between notched opposed faces of the forming members. Thus, upon the wedge-shaped actuating member 55 being returned to its upper position, the forming members 29 and 30 will be held in their actuated positions until the latch member 92 is manually withdrawn.

In the operation of the above-described apparatus and with the various operating parts in their normal inoperative positions (Figs. 1, 2, 3, 4, 8 and 9) an operator first mounts a vacuum tube stem 18 on the rest 17 in such a position that the inner end face of the stem member 24 abuts the outer face of the rest and the input leads 23 are received, respectively, in the tapered slots 26 and 37 of the rest and the forming members 29 and 30. The operator now rocks the lever actuated cam 59 counterclockwise to cause the spring-returned plunger 54 to be lowered, which movement first engages the spring-pressed pads 63 with the leads to hold them at the bottom of the slots and then the wedge-shaped member 55 moves into position between the inclined faces 56 of the forming members 29 and 30, whereupon they are moved in opposite directions to the positions shown in Fig. 6, thus bending and shaping the input leads 23 in opposite laterally offset relation, as shown at 25 (Fig. 6). During this actuation of the forming members 29 and 30, the latch member 92 springs into holding position (Fig. 7) between the latter members, as described hereinbefore. The wedge-shaped member 55 and pads 63 are then permitted to return to their inoperative positions by rocking the lever-actuated cam 59 clockwise to the position shown in Fig. 3. Following this, the operator rocks the hand lever 85 connected to the shearing bar 70, in the manner previously described, in one direction and then in the opposite direction and back to its normal position, which serves to shear the shaped input leads 23 to a predetermined length. Thereafter, the operator depresses the hand lever 50, which serves to raise the stripping member 42, and thus free the input leads 23 from the bottom of the slots 26 and 37 to permit the removal of the stem 18 from the apparatus without deformation of the leads. Upon withdrawing the latch member 92 from its operative position (Fig. 7) to its inoperative position (Fig. 9), the spring-retracted forming members 29 and 30 return to their normal positions and the apparatus is then ready for another operating cycle.

What is claimed is:

1. An apparatus for forming spaced members extending from a base comprising a support for said base, means for forming said extending members to a predetermined shape, means effective upon movement of said forming means to operative positions for retaining said forming means in operated position until said base and members are ejected, and means for ejecting said base and formed members.

2. An apparatus for forming spaced members extending from a base comprising a support for said base including a fixed support engaging portions of said members adjacent said base, movable forming means for engaging said members at a selected distance from said fixed support, means for actuating said forming means, and means effective upon movement of said forming means to operative position for retaining said forming means in actuated position during removal of said base and formed members from the apparatus.

3. An apparatus for simultaneously forming spaced members extending from a base to provide opposite laterally offset portions thereon comprising means for supporting the base and holding portions of the members adjacent the base in fixed relation, forming elements movable in opposite directions laterally of the members and having recesses for receiving and holding portions of the members contiguous to said other portions, and means for simultaneously actuating said elements in opposite directions to form the members.

4. An apparatus for simultaneously forming spaced members extending from a base to provide opposite laterally offset portions thereon comprising a support for the base having recesses for receiving and holding portions of the members adjacent the base in fixed relation, forming elements movable in opposite directions laterally of the members and having recesses for receiving and holding portions of the members contiguous to said other portions, said elements having opposite inclined adjacent end faces, and means including a wedge-shaped member engaging said inclined faces on said elements to simultaneously actuate said elements to form the members.

5. An apparatus for forming and shearing spaced members extending from a base to provide opposite laterally offset portions thereon of predetermined length comprising a support for the base having recesses for receiving and holding portions of the members adjacent the base in fixed relation, reciprocatory forming elements operable in opposite directions laterally of the members and having recesses for holding portions of the members contiguous to said other portions, said members projecting from said elements at their free ends, movable means abutting cooperating shearing edges on said elements from which the free ends of the members project for shearing the same, and means for actuating said forming elements and shearing means to form the members and shear the same to predetermined lengths.

6. An apparatus for forming and shearing spaced members extending from a base to provide opposite laterally offset portions thereon of predetermined length comprising a support for the base having recesses for receiving and holding portions of the members adjacent the base in fixed relation, forming elements movable in opposite directions laterally of the members and having recesses for receiving and holding portions of the members contiguous to said other portions, said members projecting from said elements at their free ends, a movable shearing member movable in opposite directions laterally of the members, said shearing member arranged intermediate said elements and abutting cooperating shearing edges on the faces of said elements from which the free ends of the members project for shearing the same, and means for actuating said forming elements and shearing member in opposite directions to form the members and shear the same to predetermined lengths.

7. An apparatus for forming and shearing spaced members extending from a base to provide opposite laterally offset portions thereon of predetermined length comprising a support for the base having tapered recesses for receiving and holding portions of the members adjacent the base in fixed relation, reciprocatory forming elements operable in opposite directions laterally of the members and having tapered recesses for receiving and holding portions of the members contiguous to said other portions, said elements having opposite inclined adjacent end faces, said members projecting from said elements at their free ends, a plunger movable perpendicularly to the movements of said elements, yieldable pads carried by said plunger arranged to engage the members held in the recesses of said elements, a wedge-shaped member carried by said plunger for engaging said inclined faces on said elements to simultaneously actuate said elements to form the members, movable means abutting cooperating shearing edges on said elements from which the free ends of the members project for shearing the same, movable means arranged between said support and elements for freeing the members from the tapered recesses therein after being formed and sheared, and means for actuating said plunger to cause said pads to engage the members, said wedge-shaped member to actuate the elements to form the members and said shearing means to shear the members to predetermined lengths.

8. An apparatus for forming spaced members extending from a base comprising a support for said base, means for forming said extending members to a predetermined shape, spring urged means effective upon movement of said forming means to operative position to operatively engage and retain the same in operated position until said base and members are removed, and means for withdrawing said retaining means.

9. An apparatus for forming spaced members extending from a base comprising a support for said base, individual means for forming said extending members to a predetermined shape, spring urged means movable into position between said forming means upon movement thereof to operated position for retaining the same in operated position until said base and members are removed, and means for withdrawing said retaining means.

JAMES C. HROCH, Jr.